United States Patent
Voice et al.

(10) Patent No.: US 8,322,595 B2
(45) Date of Patent: Dec. 4, 2012

(54) JOINING METHOD AND RESULTANT ARTICLE

(75) Inventors: Wayne Eric Voice, Nottingham (GB); Junfa Mei, Birmingham (GB)

(73) Assignee: Rolls-Royce PLC (GB)

( * ) Notice: Subject to any disclaimer, the term of this patent is extended or adjusted under 35 U.S.C. 154(b) by 193 days.

(21) Appl. No.: 12/197,445

(22) Filed: Aug. 25, 2008

(65) Prior Publication Data
US 2009/0072010 A1 Mar. 19, 2009

(30) Foreign Application Priority Data

Sep. 15, 2007 (GB) .................................. 0718026.8

(51) Int. Cl.
*B23K 20/00* (2006.01)
*B21K 3/00* (2006.01)

(52) U.S. Cl. ..................... 228/194; 228/193; 29/402.02; 29/402.07; 29/889.1

(58) Field of Classification Search .......... 228/193–194; 29/889.1, 402.02, 402.06, 402.07
See application file for complete search history.

(56) References Cited

U.S. PATENT DOCUMENTS

| | | | | |
|---|---|---|---|---|
| 3,483,610 | A * | 12/1969 | Campo | 228/206 |
| 4,060,413 | A * | 11/1977 | Mazzei et al. | 419/6 |
| 4,241,135 | A * | 12/1980 | Lee et al. | 428/332 |
| 4,485,961 | A | 12/1984 | Ekbom et al. | |
| 4,529,452 | A | 7/1985 | Walker | |
| 4,811,892 | A | 3/1989 | Kunzmann et al. | |
| 5,390,413 | A * | 2/1995 | Pratt | 29/889.21 |
| 2006/0086776 | A1 | 4/2006 | Gandy et al. | |
| 2006/0201998 | A1 | 9/2006 | Witte et al. | |
| 2007/0044406 | A1 * | 3/2007 | Van Aken et al. | 52/459 |
| 2007/0226973 | A1 * | 10/2007 | Crockett et al. | 29/25.01 |
| 2007/0283549 | A1 * | 12/2007 | Twigg | 29/428 |

FOREIGN PATENT DOCUMENTS

| | | |
|---|---|---|
| EP | 0042744 A1 | 12/1981 |
| GB | 2109274 A | 6/1983 |
| WO | 2005123310 A1 | 12/2005 |

OTHER PUBLICATIONS

Article entitled "The Metallurgy of Carbon Steel" from http://www.gowelding.com/met/carbon.htm (6 pages).
Solution Annealing Question and Answer page from http://coolinterview.com/interview/27140/ (3 Pages).
Definition of "phase", McGraw-Hill Dictionary of Scientific and Technical Terms, 5th Edition, McGraw-Hill, Inc., p. 1484.

* cited by examiner

*Primary Examiner* — Devang R Patel
(74) *Attorney, Agent, or Firm* — McCormick, Paulding & Huber LLP

(57) ABSTRACT

A method of manufacturing an article by diffusion bonding, the method comprising the steps of assembling first and second component parts having a joint therebetween; sealing the joint against infiltration by solid particulate material, without causing phase change of the component parts; and applying heat and isostatic pressure via a solid particulate material to form a consolidated joint by diffusion bonding.

9 Claims, 4 Drawing Sheets

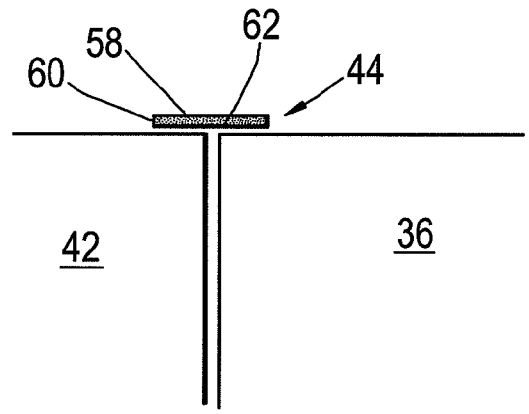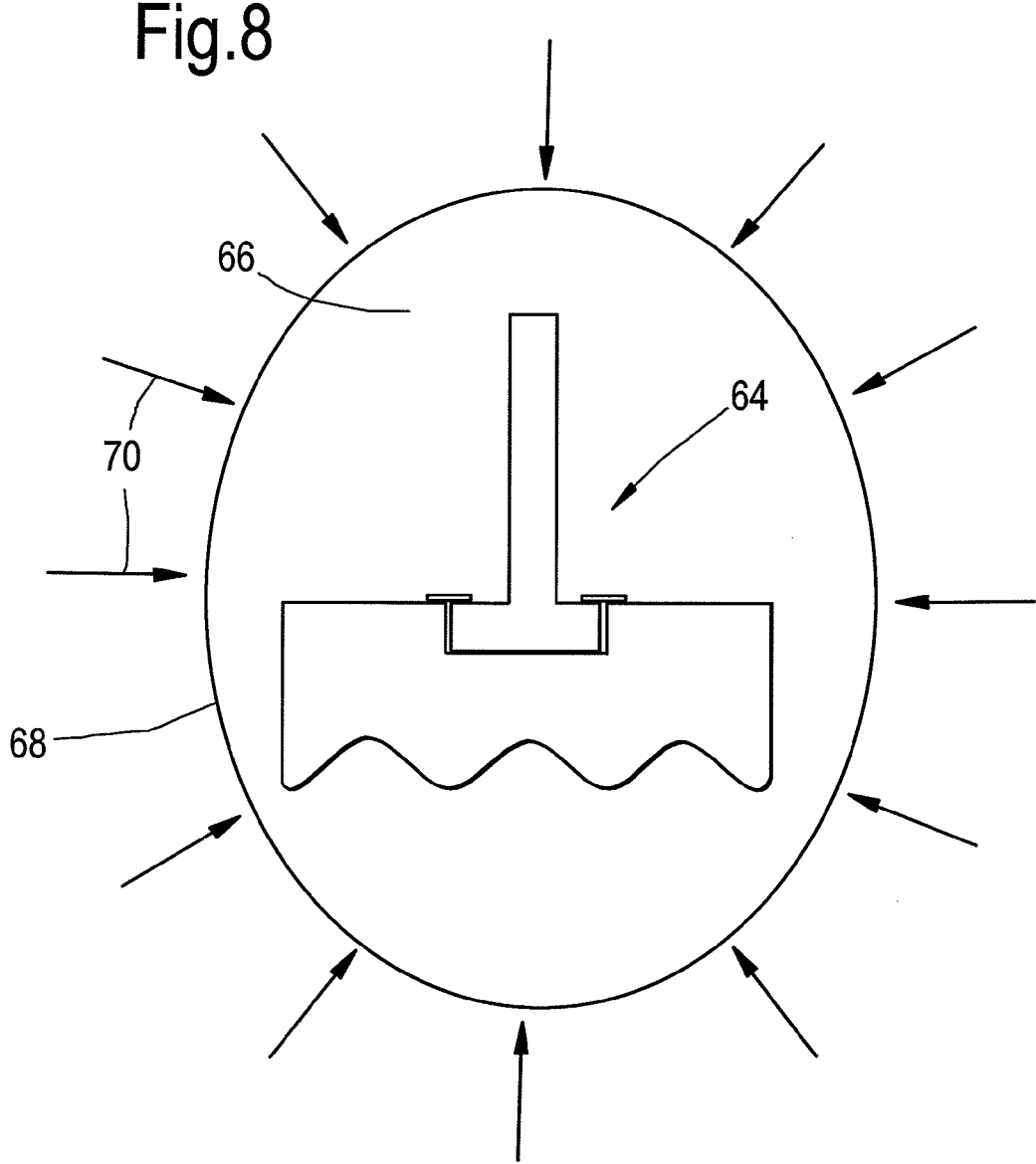

JOINING METHOD AND RESULTANT ARTICLE

CROSS REFERENCE TO RELATED APPLICATION

This application is entitled to the benefit of British Patent Application No. GB 0718026.8 filed on Sep. 15, 2007.

FIELD OF THE INVENTION

The present invention relates to a joining method and an article formed thereby and is more particularly related to manufacturing an article by joining component parts by diffusion bonding. It finds particular application in joining components to form components of a gas turbine engine in which the joints must be of high integrity. However, it is also applicable to diverse other applications.

BACKGROUND OF THE INVENTION

There are many industries in which it is necessary to produce relatively complex components having good mechanical properties but that are relatively cheap, produce little waste material and have a low scrap rate in production. Such components may be components for a gas turbine engine, such as an integrally bladed disc (known as a blisk) for a compressor or turbine stage.

Typically, such components are machined from wrought material. Whilst machining from a wrought material block provides a component with good mechanical properties, it can result in large amounts of material being machined away as waste. Furthermore, to produce complex shapes, particularly having tight tolerances, may require considerable machining time and/or complex tooling to achieve the desired profiles.

An alternative conventional method of producing such articles or components is by casting, which produces less waste material than machining from wrought. Complex components may require additional protrusions to assist in supporting the component and controlling material distribution during the casting process. Therefore, cast components may require subsequent machining to remove these additional protrusions. Nevertheless, there is less material wastage, and hence expense, in casting complex components than in machining from wrought. However, one problem with this method is that casting is a relatively lengthy process since a sacrificial mould must be formed, the molten material poured into the mould, the mould and molten material slowly cooled and then the mould removed.

Another problem with casting is that the mechanical properties of a cast component are relatively poor due to porosity caused by entrapped gases and shrinkage, inhomogeneous structure, inclusions and segregation within the component. The component is also prone to significant shrinkage due to the large thermal expansion coefficient during the liquid to solid phase change. In most cases, this leads to a requirement for the casting to be larger than the desired end component size. The poor mechanical properties may make castings unsuitable for some applications, especially those in fatigue situations, or lead to a high scrap rate in production due to the high product integrity required.

A still further conventional method of joining components is by electron beam welding as shown in U.S. Pat. No. 5,390,413. Although this is an effective joining method, a problem with it is the microstructural changes and phase changes caused in and around the weld area by the heat effects. This can weaken the bond between component parts, stress the component parts and/or change the properties of the resultant article. Other problems are the relatively large amount of post-weld machining required to achieve the desired shape, the component design limitations imposed by the heavy tooling and required welding motion, and the high levels of capital investment and development work required to produce new components.

The present invention seeks to provide a method of manufacturing an article by joining component parts, and an article formed thereby, that seeks to address the aforementioned problems.

SUMMARY OF THE INVENTION

Accordingly, the present invention provides a method of manufacturing an article by diffusion bonding, the method comprising the steps of assembling first and second component parts having a joint therebetween; sealing the joint against infiltration by solid particulate material, without causing phase change of the component parts; and applying heat and isostatic pressure via a solid particulate material to form a consolidated joint by diffusion bonding.

Preferably, the method further comprises the step of machining the consolidated joint to provide the required surface finish.

Preferably, the step of assembling the component parts comprises forming a slot in the first component part and inserting at least a part of the second component part into the slot in the first component part to form an interference fit joint.

Preferably, the step of sealing the joint comprises smearing material from one or both of the component parts across the joint. Preferably, the smearing is performed by burnishing the joint with a burnishing tool.

Alternatively, the step of sealing the joint comprises shot peening the joint. Preferably, the material used in the shot peening is the same material as that used in the component parts.

Alternatively, the step of sealing the joint comprises securing a thin foil sheet across the joint. Preferably, the thin foil sheet comprises mild steel. Preferably, the thin foil sheet is bound to the joint by adhesive. More preferably, the adhesive is ceramic cement.

Alternatively, the step of sealing the joint comprises applying a powder in a binder across the joint. Preferably, the powder is the same material as the component parts. More preferably, the powder comprises particles with a diameter of less than 20 microns. Preferably, the binder comprises a water-based binder.

Preferably, the first component part is a disc and the second component part is a blade.

A second aspect of the present invention provides a method according to any of the previous eight paragraphs wherein the method further comprises, between the assembling and sealing steps, the step of assembling at least one further component part, the or each further component part having a further joint with the first component part and/or the second component part.

A third aspect of the present invention provides a method according to the same eight paragraphs wherein the method further comprises, between the sealing and applying heat and isostatic pressure steps, the steps of assembling at least one further component part, the or each further component part having a further joint with the first component part and/or the second component part and sealing the further joint against infiltration by solid particulate material, without causing phase change of the component parts.

A final aspect of the present invention provides a gas turbine engine comprising an article manufactured by the method described above.

BRIEF DESCRIPTION OF THE DRAWINGS

FIG. 7 is an enlargement of the joint showing a fourth embodiment of the second step of the method of the present invention.
FIG. 8 is a schematic side view of a blisk assembly at the final step in the method of the present invention.

DETAILED DESCRIPTION OF THE PREFERRED EMBODIMENTS

Figure 1:
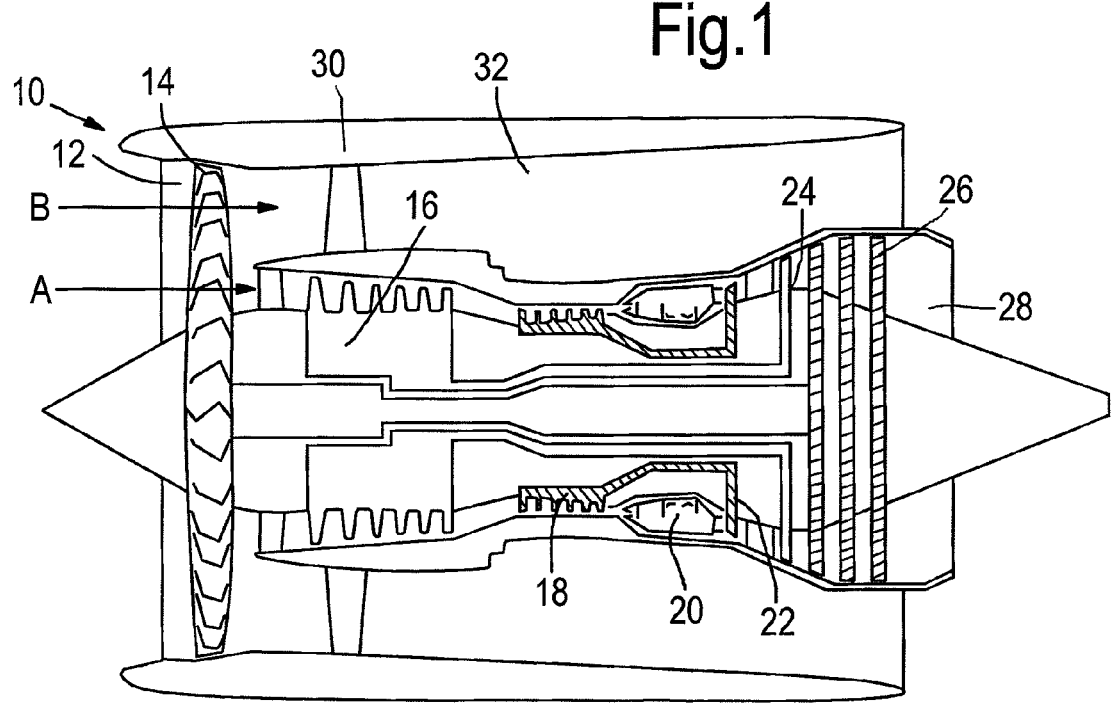
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 2:
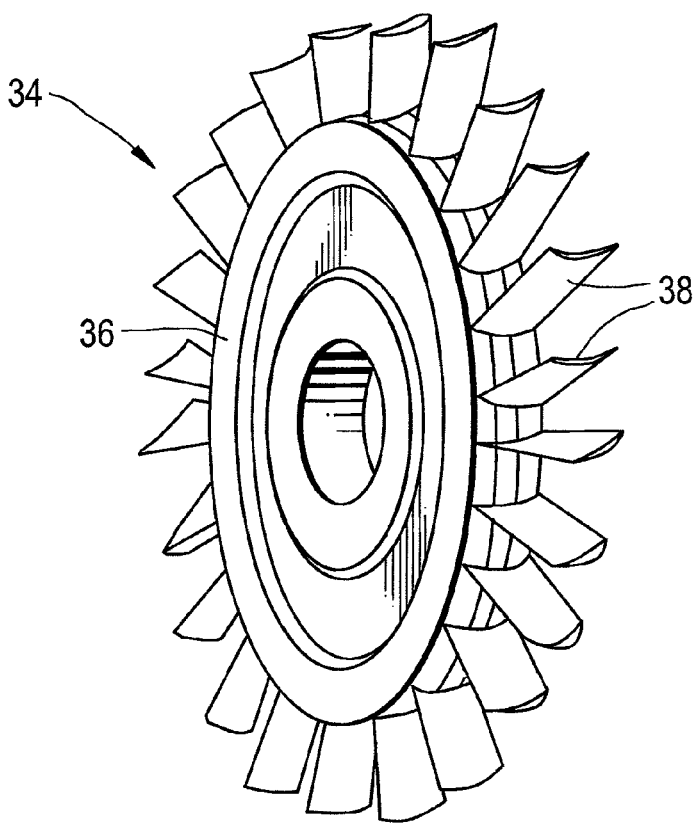
FIG. 2 is a perspective view of a blisk manufactured according to the method of the present invention.

The fan 14, compressors 16, 18 and turbines 22, 24, 26 may all be formed as integrally bladed discs, or blisks 34. A typical blisk 34 is shown in FIG. 2 and comprises a disc 36 integrally formed with one or more arrays of blades 38 on its peripheral surface. Typically, the disc 36 and blades 38 are formed separately and then joined together to form the blisk 34. The method of the present invention finds particular utility in forming blisks from a disc and a plurality of blades.

Figure 3:
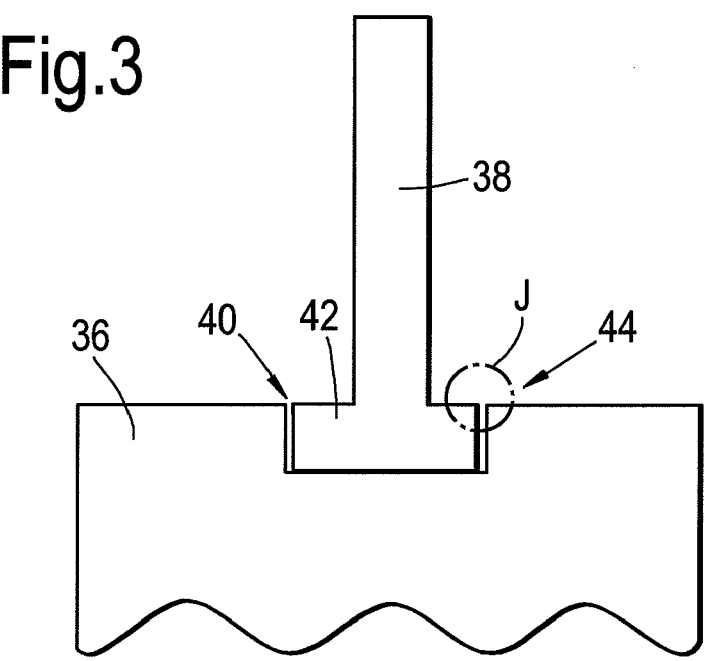
FIG. 3 is a schematic side view of a blisk assembly at the first step in the method of the present invention.

The method of the present invention will now be described with reference to the assembly shown in FIG. 3. In the first step of the manufacturing method of the present invention, a disc 36 has a slot 40 formed in its peripheral surface. A blade 38 with a widened root portion 42 is pushed into the slot 40 to form an interference fit. A joint 44 is formed between the disc 36 and the root portion 42 of the blade 38. Although the joint 44 is formed as a interference fit, this is not a sufficiently tight joint to prevent particulate material from entering the joint, and thereby weakening it, during the application of heat and isostatic pressure which constitutes the final step of the method. Particulate material that may contaminate the joint includes the particulate material used to transfer heat and isostatic pressure but can also include dust or other foreign matter that may accumulate on the assembly or the constituent parts 36, 38 during storage prior to assembly or between assembly and the application of heat and pressure.

The disc 36 is typically machined from a wrought block of titanium 6/4 and the blades 38 are typically forged from titanium 6/4. However, other materials suitable to the application may be contemplated without departing from the scope of the invention herein described.

The second step of the method of the present invention is concerned with sealing the joint 44 against infiltration by particulate material. FIGS. 4-7 are enlargements of the joint area, marked as J on FIG. 3, showing respectively four embodiments of the sealing step of the method of the present invention. Each shows part of the disc 36, the root portion 42 of the blade 38 and the joint 44 therebetween.

Figure 4:
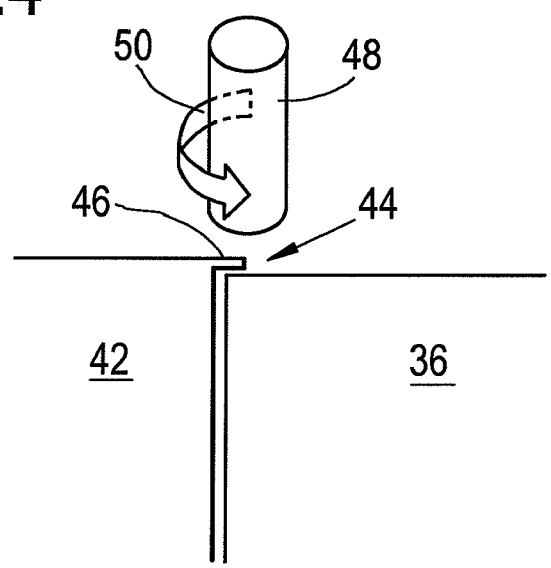
FIG. 4 is an enlargement of the joint showing a first embodiment of the second step of the method of the present invention.

FIG. 4 shows a step of smearing material from the root portion 42 of the blade 38 across the joint 44 and onto the disc 36. This forms an impenetrable barrier layer 46 across the joint 44 without significantly disrupting the profile of either the root portion 42 of the blade 38 or the disc 36. The barrier layer 46 is formed by burnishing. In the figure, a burnishing tool 48 is brought into contact with the surface of the component to be smeared and rotated, either clockwise or anti-clockwise, as shown by arrow 50. This disrupts the material on the surface of the component and spreads it to form the barrier layer 46, which is impermeable to particulate material but may not be impermeable to gases. There is no requirement to heat the component during burnishing, either generally or in the vicinity of the joint 44. The process of burnishing the joint 44, or smearing material across it, does not cause heating or melting of either the root portion 42 of the blade 38 or the disc 36. This is beneficial because it prevents the microstructural changes and phase changes that are produced around areas of significant heating, for example in and around welded joints. It also removes the need for additional heat sinks or coolant application to try to counteract these effects.

Alternatively, the material may be smeared from the disc 36 across the joint 44 and onto the root portion 42 of the blade 38 to form the barrier layer 46. It will generally be a matter of convenience or design which component the material is smeared from.

Figure 5:
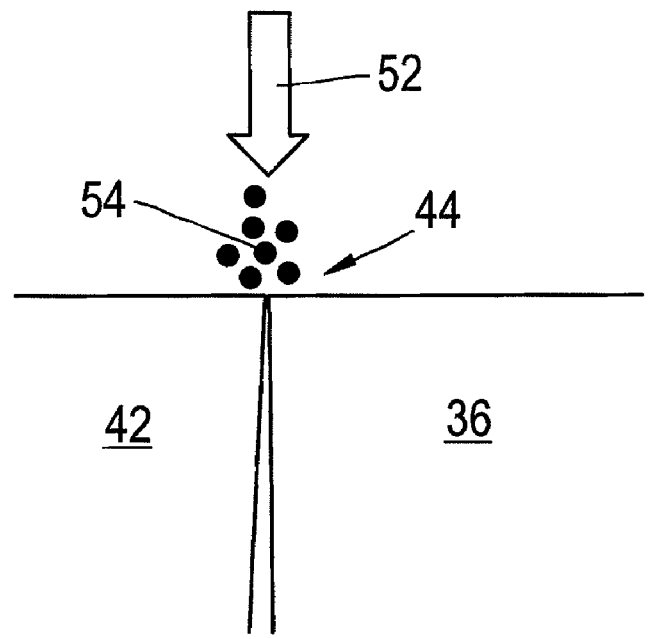
FIG. 5 is an enlargement of the joint showing a second embodiment of the second step of the method of the present invention.

FIG. 5 shows a second embodiment of a sealing step of the method of the present invention. A shot peening source 52 is located above and traverses along the joint 44. The source 52 discharges shots 54 towards the joint 44. Preferably the shots 54 are the same material as the disc 36 and/or the root portion 42 of the blade 38 to prevent contamination of the joint 44, for example titanium 6/4. Alternatively, the shots 54 may be a different material. The impact of the shots 54 on the joint 44 locally plastically deforms the surface of the components 42, 36 around the joint 44 to compress the joint 44 and thereby close its edges together. This forms a barrier at the joint 44 that is impermeable to particulate material, but not necessary to gases. As with the first embodiment, no heating or melting of the root portion 42 of the blade 38 or the disc 36 is caused by shot peening and hence there is no phase change or microstructural changes.

Figure 6:
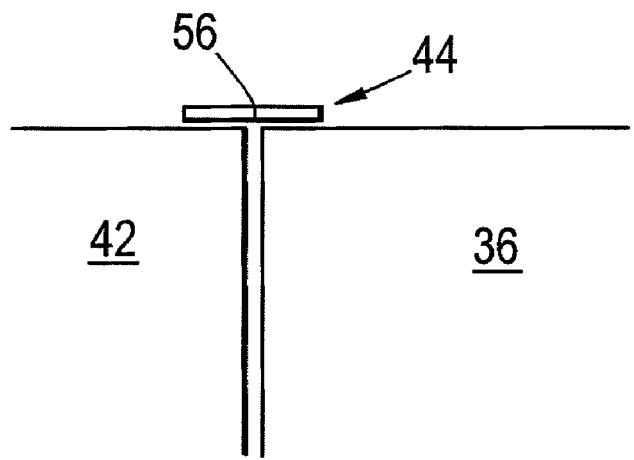
FIG. 6 is an enlargement of the joint showing a third embodiment of the second step of the method of the present invention.

FIG. 6 shows a third embodiment of a sealing step of the method of the present invention. A thin foil sheet 56 is placed over the joint 44 so that it overlaps onto both the disc 36 and the root portion 42 of the blade 38. The thin foil sheet 56 is preferably secured to the components 42, 36 to improve the impermeability of the barrier thereformed and to allow the blisk 34 to be rotated, for example to enable other blades 38 to be inserted into slots 40 in the disc 36 prior to the application of heat and isostatic pressure. Any known method of securing the thin foil sheet 56 to the components 42, 36 may be used as known in the art, none of which require the blade 38 or the disc 36 to be heated or melted or to undergo phase changes. Typically, the foil sheet 56 may be wrapped around the joint 44. Alternatively, the foil sheet 56 may be secured using adhesive, particularly a ceramic cement.

The foil sheet 56 may comprises a mild steel. Alternatively, it may comprise the same material as the root portion 42 of the blade 38 and/or the disc 36, particularly Ti 6/4 to avoid contamination of the joint 44.

A fourth embodiment of the sealing step of the method of the present invention is shown in FIG. 7. A paste 58 comprising powder 60 in a binder 62 is applied across the joint 44 to form a barrier layer that is impenetrable to particulate material, but not necessarily to gases. The paste 58 is applied without heating or melting and therefore does not cause phase changes or microstructural changes. Preferably, the powder 60 comprises the same material as the disc 36 and root portion 42 of the blade 38, being a metal, particularly Ti 6/4. This prevents contamination of the joint 44. Alternatively, the powder 60 may comprise a different material. Typically, the powder particles 60 have a diameter of less than 20 microns. The paste 58 typically comprises mainly powder 60 with a few percentage of the total volume comprising the binder 62.

The binder 62 may be any suitable composition as is known in the art. A typical aqueous binder 62 comprises 200 g water, 0.5 g glycerol and 1.5 g cellulose. However, other aqueous, solvent or polymer-based binders may be used as is well known in the art. This forms a paste 58 that is sufficiently adhesive to adhere to the components 42, 36 and that forms a smooth barrier layer to prevent infiltration of the joint 44 by particulate material during the step of applying heat and isostatic pressure.

The final step in the method of the present invention is shown in FIG. 8. The sealed assembly 64, comprising the disc 36 and blade or blades 38, with the joints 44 sealed by any of the embodiments described above is prepared for the application of heat and isostatic pressure. The sealed assembly 64 is surrounded by solid particulate material 66, typically silica sand or an alternative inert sand. Surrounding and enclosing the sealed assembly 64 and the particulate material 66 is a pliant chamber 68, which can deform under applied pressure and is gas impermeable. A vacuum is then created within the pliant chamber 68.

The final step of the method of the present invention involves applying heat and isostatic pressure 70 to the pliant chamber 68. The isostatic pressure 70, typically supplied by pressurising argon against the pliant chamber 68, deforms the wall of the pliant chamber 68 inwardly towards the sealed assembly 64 whilst both the heat and isostatic pressure 70 are transmitted through the solid particulate material 66 to the sealed assembly 64. This has the effect of diffusion bonding the component parts of the sealed assembly 64 together to form a blisk 34 as shown in FIG. 2. The barrier formed across the joint 44 by any of the embodiments of the sealing step prevents any of the solid particulate material 66 entering the joint 44 and thereby weakening it or altering the mechanical properties of it.

Subsequent to the application of heat and isostatic pressure the blisk 34, particularly around where the joint 44 was, may be machined to provide the desired surface profile of the blisk 34 and to remove any minor surface impurities, for example from the thin foil sheet 56.

The method of the present invention provides a fully consolidated, diffusion bonded component, blisk 34, with substantially the same material properties as the constituent component parts, disc 36 and blades 38, produced by machining from a wrought block or forging.

Although the method of the present invention has been described with respect to manufacturing a blisk, it is equally applicable to the manufacture of other components within a gas turbine engine including, but not limited to, outlet guide vanes and centrifugal compressors. Similarly, the method can be used to manufacture articles and components by diffusion bonding in other industries in which there is a requirement to form components from constituent parts without degrading the mechanical properties in or near the joint.

Different materials or alloys may be utilised with equal felicity in the method of the present invention. Two component parts formed of different materials or alloys may be joined by the method of the present invention to form a graded functionality component.

Although the isostatic pressure source has been described as argon, any suitable alternative as known in the art may be substituted to derive the benefits of the present invention.

It will be appreciated that the article produced is cheaper and easier to manufacture by the method of the present invention than by prior art methods. The sealing performed has a less stringent sealing requirement, since it need withstand only particulate material and not gas infiltration.

What is claimed is:

1. A method of manufacturing an article by diffusion bonding, the method comprising the steps of:
    a) assembling first and second component parts having a joint therebetween;
    b) sealing the joint against infiltration by solid particulate material, by smearing material from one or both of the component parts across the joint, without causing phase change of, or microstructural changes to, the component parts;
    c) enclosing the sealed joint with a solid particulate material;
    d) creating a vacuum encompassing the sealed joint; and
    e) applying heat and isostatic pressure to the sealed joint solely via the solid particulate material to form a consolidated joint by diffusion bonding.

2. A method as claimed in claim 1 wherein the method further comprises the step of machining the consolidated joint to provide the required surface finish.

3. A method as claimed in claim 1 wherein the step of assembling the component parts comprises forming a slot in the first component part and inserting at least a part of the second component part into the slot in the first component part to form an interference fit joint.

4. A method as claimed in claim 1 wherein the smearing is performed by burnishing the joint with a burnishing tool.

5. A method as claimed in claim 1 wherein the first component part is a disc.

6. A method as claimed in claim 1 wherein the second component part is a blade.

7. A method as claimed in claim 1 wherein the method further comprises, between steps 1a) and 1b), the step of
    assembling at least one further component part, the or each further component part having a further joint with at least one of the first component part or the second component part.

8. A method as claimed in claim 1 wherein the method further comprises, between steps 1b) and 1c), the steps of
    assembling at least one further component part, the or each further component part having a further joint with at least one of the first component part or the second component part; and
    sealing the further joint against infiltration by solid particulate material, without causing phase change of, or microstructural changes to, the component parts.

9. A gas turbine engine made in accordance with a method comprising the steps of:
    a) assembling first and second component parts having a joint therebetween;

b) sealing the joint against infiltration by solid particulate material, by smearing material from one or both of the component parts across the joint, without causing phase change of, or microstructural changes to, the component parts;
c) enclosing the sealed joint with a solid particulate material;
d) creating a vacuum encompassing the sealed joint; and
e) applying heat and isostatic pressure to the sealed joint solely via the solid particulate material to form a consolidated joint by diffusion bonding.

* * * * *